(12) United States Patent
Huang et al.

(10) Patent No.: US 8,423,768 B2
(45) Date of Patent: Apr. 16, 2013

(54) METHOD FOR CONTROLLING THE LOCATION INFORMATION FOR AUTHENTICATION OF A MOBILE STATION

(75) Inventors: Tea Vui Huang, Singapore (SG); Jari Nyholm, Stockholm (SE)

(73) Assignee: Smarttrust AB, Stockholm (SE)

( * ) Notice: Subject to any disclaimer, the term of this patent is extended or adjusted under 35 U.S.C. 154(b) by 960 days.

(21) Appl. No.: 12/064,256

(22) PCT Filed: May 17, 2006

(86) PCT No.: PCT/SE2006/000569
§ 371 (c)(1),
(2), (4) Date: Sep. 4, 2008

(87) PCT Pub. No.: WO2007/024170
PCT Pub. Date: Mar. 1, 2007

(65) Prior Publication Data
US 2009/0222669 A1 Sep. 3, 2009

(30) Foreign Application Priority Data
Aug. 23, 2005 (SE) ........................................ 0501871

(51) Int. Cl.
*H04L 29/06* (2006.01)
(52) U.S. Cl.
USPC .................................. 713/168; 713/182; 726/4
(58) Field of Classification Search .................. 713/168, 713/182; 726/4
See application file for complete search history.

(56) References Cited

U.S. PATENT DOCUMENTS

| 5,243,652 | A | * | 9/1993 | Teare et al. | 380/250 |
|---|---|---|---|---|---|
| 6,097,938 | A | | 8/2000 | Paxson | |
| 6,104,815 | A | * | 8/2000 | Alcorn et al. | 380/251 |
| 6,154,172 | A | * | 11/2000 | Piccionelli et al. | 342/357.395 |
| 6,490,519 | B1 | * | 12/2002 | Lapidot et al. | 701/117 |
| 7,120,254 | B2 | * | 10/2006 | Glick et al. | 380/258 |
| 7,221,949 | B2 | * | 5/2007 | Clough | 455/456.3 |
| 7,289,805 | B2 | * | 10/2007 | Tom et al. | 455/432.1 |
| 7,372,839 | B2 | * | 5/2008 | Relan et al. | 370/338 |
| 2002/0070273 | A1 | * | 6/2002 | Fujll | 235/382 |
| 2003/0080183 | A1 | * | 5/2003 | Rajasekaran et al. | 235/379 |
| 2003/0115452 | A1 | * | 6/2003 | Sandhu et al. | 713/155 |
| 2004/0015689 | A1 | * | 1/2004 | Billhartz | 713/156 |
| 2004/0044911 | A1 | * | 3/2004 | Takada et al. | 713/201 |
| 2004/0059914 | A1 | * | 3/2004 | Karaoguz | 713/168 |
| 2004/0097217 | A1 | * | 5/2004 | McClain | 455/411 |
| 2005/0037729 | A1 | * | 2/2005 | Dupont et al. | 455/404.2 |
| 2005/0071671 | A1 | * | 3/2005 | Karaoguz | 713/200 |
| 2005/0148320 | A1 | * | 7/2005 | Tanabe | 455/411 |
| 2006/0010074 | A1 | * | 1/2006 | Zeitsiff et al. | 705/52 |
| 2006/0036858 | A1 | * | 2/2006 | Miura et al. | 713/170 |
| 2006/0069916 | A1 | * | 3/2006 | Jenisch et al. | 713/172 |
| 2006/0123335 | A1 | * | 6/2006 | Sanchez et al. | 715/517 |
| 2006/0227378 | A1 | * | 10/2006 | Mihira | 358/1.16 |
| 2007/0060358 | A1 | * | 3/2007 | Amaitis et al. | 463/42 |

* cited by examiner

*Primary Examiner* — Michael Pyzocha
(74) *Attorney, Agent, or Firm* — Fasth Law Offices; Rolf Fasth

(57) ABSTRACT

The method is for authentication in a communication network. A mobile station and an authentication server give access to services in the network. A user of a mobile station first sends a request for a service or a password in a message from the mobile station. The authentication server controls the location information for the mobile station, and sends a password to the mobile station or grants access to the user as a reply to the request if the location information is accepted by the server.

19 Claims, 2 Drawing Sheets

METHOD FOR CONTROLLING THE LOCATION INFORMATION FOR AUTHENTICATION OF A MOBILE STATION

PRIOR APPLICATIONS

This is a US national phase patent application that claims priority from PCT/SE2006/000569 filed 17 May 2006, that claims priority from Swedish Patent Application No. 0501871-8, filed 23 Aug. 2005.

TECHNICAL FIELD

Method for authentication in a telecommunication network, comprising a mobile station and an authentication server giving access to services in the network.

BACKGROUND

Authentication is used as a defense against unauthorized access to a computer network. It uses an exchange of information to verify the identity of a user. The information can be encrypted at both ends.

Authentication over a network is an especially important part for enabling security when remote clients are allowed to access network servers. Generally, authentication can be accomplished by verifying one or more of a password or PIN (something that a user knows), a biometric information (something that a user is), and some identification token, such as a smart-card (something that a user has).

In addition to authentication, key exchange is an important part of communication across a data network. Once a client and server have been authenticated, a secure communication channel can be set up between them, which is achieved by exchanging keys for the communication.

Authentication over a data network, especially a public data network like the Internet, is difficult because the communication between the client and server is susceptible to many different types of attacks.

A basic authentication scheme is for a server to request a password from the client. The client types the password and sends it over the wire to the server. This technique is vulnerable to eavesdroppers who may be monitoring the line with sniffers and network analyzers. Captured information can be used by a hacker in what is called a "replay attack" to illegally log on to a system. Even an encrypted password can be used in this manner.

For example, in an eavesdropping attack, an adversary may learn secret information by intercepting communication between the client and the server. Another type of attack is a spoofing attack, in which an adversary impersonates the server, so that the client believes that it is communicating with the legitimate server, but instead is actually communicating with the adversary. In such an attack, the client may provide sensitive information to the adversary. If the adversary learns password information, the adversary may replay that information to the server to impersonate the legitimate client in what is called a replay attack. Replay attacks are effective even if the password sent from the client is encrypted because the adversary does not need to know the actual password, but instead must provide something to the server that the server expects from the legitimate client (in this case, an encrypted password).

Further, in any password based authentication protocol, there exists the possibility that passwords will be weak such that they are susceptible to dictionary attacks. A dictionary attack is a brute force attack on a password that is performed by testing a large number of likely passwords (e.g. all the words in an English dictionary) against some known information about the desired password. The known information may be publicly available or may have been obtained by the adversary through one of the above described techniques. Dictionary attacks are often effective because users often choose easily remembered, and easily guessed, passwords.

One solution to avoid attacks with replaying captured reusable passwords is to use one-time passwords (OTP). A one-time password can e.g be one password in a set of passwords, so constructed that it is extremely difficult to calculate the next password in the set given the previous passwords. A one-time password system may consist of the user being presented with a one-time password on the screen, where this grants the visitor access for one day. After the given time period finishes, no more passwords are available to the visitor, and thus the access to the system is removed.

Usually, a OTP (one-time password) system generates a series of passwords that are used to log on to a specific system. Once one of the passwords is used, it cannot be used again. The logon system will always expect a new one-time-password at the next logon. This is done by decrementing a sequence number. Therefore, the possibility of replay attacks is eliminated One-time passwords are e.g. used by traveling computer users, who often want to connect to their home system via untrusted terminals at conference hotels, other universities, and airports, where trusted encryption software is not available. A loss of confidentiality is often acceptable in these situations for the session content, but not for reusable login passwords. The goal of a one-time-password login scheme is merely to provide a significant increase of security but it does not protect from sophisticated active attacks such as session hijacking, host emulation, man-in-the-middle, etc.

In determining which type of authentication to use, an analysis of the security level needed and the existing situation are usually done. It can e.g. be considered whether a session takes place between two machines or between a human being and a machine, and then decide how strong the authentication mechanism must be.

For example, if the connection is negotiated between two machines, it should be considered whether the other location is trusted, whether that machine protects its own networks against security attacks, and whether it is physically accessible to many users.

If the connection is negotiated with a user who must type in a token or password, it should be considered how secure the password is and how frequently it should be changed or if one-time passwords should be used. Once the user's connection is authenticated, authorization restrictions can be used to prevent the caller from accessing systems or networks waned to be protected.

The authentication process is typically handled by access protocols, all of which include password encryption. Password encryption protects against passive attacks, in which an unauthorized user monitors information being transmitted, and tries to use it later to establish what appears to be a valid session.

Authentication of terminal-server logins uses password expiration as an added security measure.

The most secure password authentication uses token cards to overcome the limitations of static passwords. Token cards protect against both passive attacks and replay attacks, in which an unauthorized user records valid authentication information exchanged between systems and then replays it later to gain entry. Because token cards provide one-time-only passwords, the password changes many times a day, making replay impossible.

Pre-authentication methods use call information to verify the calling number and dialed number, respectively, before answering a call. Using callback for added security takes place so that after authentication is complete, the call is hang up and a call back is made, ensuring that the connection is made only with a trusted number.

A rise recently in computer-based attacks is likely to continue. The vulnerabilities that are being exploited are complex and the hackers that are perpetrating attacks are becoming ever more sophisticated.

In an increasingly interconnected world more dependent on computers than ever before, hacking is a growing and very serious threat to information and computer security. Additionally, hackers have more tools and techniques than ever before, and the number of attacks is growing daily. For governments, businesses and ordinary individuals, the threat of hacking has created a need for secure information systems and networks which has never been greater.

The ability to gain access to a computer system or network that otherwise are unauthorized to access causes mischief, fraud, theft, deception, destruction or some other harm. Hacking (or cracking, the criminal aspect of the activity) consist of seizing control (or attempting to) of an information system to disrupt, deny use, steal resources, steal data of value, monitor surreptitiously, or otherwise cause harm.

Hackers may also hack into a computer system and not change, add or take anything. They merely enter the unauthorized site and leave it exactly as it was found. The fundamental problem is, however, that when there is unauthorized access of information systems, there is a loss of control. Many security experts say that once a system has been infiltrated, even if the information has not been altered, the system can no longer be trusted.

New hacker techniques are developed and new security vulnerabilities in networks are found every day. Hackers are getting more and more advanced and thus, harder to prevent and detect.

A hacker can steal or guess a password or encryption key in order to gain access to a computer system. Using this method, a hacker does not have to sit at the computer and guess the password, because the computer can actually do the guessing itself.

The above described problems indicate that there is a continuous need to develop new methods and aspects for ensuring secrecy to be the step before advanced hackers.

SUMMARY OF THE INVENTION

The invention provides a method for authentication in a communication network, comprising a mobile station and an authentication server giving access to services in the network. In the steps of the method, a user of a mobile station first sends a request for a service or a password in a message from the mobile station. The authentication server controls the location information for the mobile station, and grants access to the service the user requested if the location information is accepted by the server.

In one embodiment, the authentication server grants access to the service by e.g. sending a password to the mobile station as a reply to the request if the location information is accepted by the server.

In one embodiment, the authentication server gets the location information from the mobile station, in e.g. such a way that the mobile station sends the location information to the authentication server together with the request. The request is a request for a service the user wish to make use of (or request for a password). The authentication server can also control the location information by sending a request for location information to the mobile station.

The mobile station monitors the location by asking an application in the mobile station, which has information of the serving base station. Said application is most preferably in the Subscriber Identification Module (SIM) of the mobile station. The Subscriber Identity Module (SIM) is a kind of a smart card inside GSM phones. The Global System for Mobile Communication (GSM) is a standard for digital wireless communications with different services, such as voice telephony and the Short Message Service (SMS). The SIM card was originally designed as a secure way to connect individual subscribers to the network but is nowadays often also used as a standardized and secure application platform for GSM and next generation networks.

In this text, the terms are used so that The Mobile Station (MS) (also called the Mobile Phone) consists of two distinct entities, the Mobile Equipment (ME) and the Subscriber Identity Module (SIM), implemented as a Smart Card. ME is the actual hardware, which consists of the physical equipment, such as the radio transceiver, display and digital signal processors, also called Terminal or Handset. The subscriber information is stored in the Subscriber Identity Module (SIM), implemented as a Smart Card.

Alternatively, the mobile station gets the location information by means of the Global Positioning Service (GPS). The Global Positioning System (GPS) is a positioning system to offer highly precise location data. GPS use satellites in space as reference points for locations on earth in order to calculate positions accurate to a matter of meters. A GPS signal contains exact information of e.g. the position of a GSM-phone. A GPS configuration has a GPS receiver and antenna, and software to interface differentially-corrected GPS data from the receiver to other electronic equipment.

In a further alternative, the authentication server gets the location information from a network entity with information of the serving base station.

The functional architecture of a GSM system can be broadly divided into the Mobile Station (MS), the Base Station Subsystem (BSS), and the Network Subsystem. The subscriber carries the mobile station, the base station subsystem controls the radio link with the mobile station and the network subsystem performs the switching of calls between the mobile users and other mobile and fixed network users. The second one, the Base Station Subsystem (BSS) controls the radio link with the Mobile Station. A cell is formed by the coverage area of a Base Transceiver Station (BTS), which serves the MS in its coverage area. Several BTS stations together are controlled by one Base Station Controller (BSC). The BTS and BSC together form the Base Station Subsystem (BSS).

The invention makes use of the intrinsic security provided by the systems used by a mobile network, such as GSM. Mobile Networks need a higher level of protection than traditional telecommunication networks, since the radio path is the weakest part of the system. To protect the system against unauthorized use of its resources and easy eavesdropping with radio equipment, it is necessary to perform authentication of the users and their equipment and ciphering information and data sent over the network. Authentication (to get access to the mobile network itself) involves the SIM card and an Authentication Center, which is a part of GSM. A secretkey, stored in the SIM card and the Authentication center together with a ciphering algorithm, are used to authenticate the user in GSM.

There are many ways in to further increase security in the invention. The security level needed might vary.

The mobile station can e.g. send time information in its messages to the authentication server in order to avoid multiplied use of the message to the authentication center. If the access is granted by sending a password to the mobile station, the password can be a one-time password (OTP). In its service request, the mobile station might send a PIN code to the authentication server and/or the mobile station sends the foregoing password to the authentication center to be compared by the authentication server. A PIN code is a Personal Identification Number required in several situations for access to different services that needs to be input by a user.

The location information, the time information, the PIN code and/or the foregoing password is/are sent to the authentication center together with the password request or together with an encrypted challenge in one or more separate messages.

In an especially secure embodiment, the authentication server sends a challenge to the mobile station as a reply to the service request. The mobile station then encrypts the challenge, e.g. with a private key stored in the mobile station, preferably on the SIM card, and sends it back to the authentication server. The authentication server decrypts the challenge, with the public key of the user of the mobile station, and grants to the user if both the location information and the decrypted challenge are accepted by the server.

In communication systems, security can be introduced by e.g. using symmetric encryption methods or known Public Key Infrastructures using asymmetric encryption methods for encrypting messages, creating digital signatures and for verifying the signature of a sender of a message.

The principle of such infrastructures can be that everyone in the communication system has a public key, that is known for everyone in the system and which is used to encrypt messages, and a private key for decrypting messages that are encrypted with the public key.

A common way of proving an identity is to use a signature. If a message instead is encrypted with the private key, the message can be decrypted with the public key. The idea of signing messages with the RSA system is encryption with the private key and decryption with the public key, in which case it is certain that only the holder of the private key could have sent that message.

Thus, a key pair can be used in an opposite direction for digitally signing of messages in such a way that a message is signed with the private key (the message or a part of it is encrypted with the private key) and the signature is verified with the public key (by decrypting with the public key). In practice it is only a digest of the message that is encrypted with the private key to avoid overlong messages.

The authentication server gives access to a service to the user by e.g. sending a password if both the location information and one or more of time information, the decrypted challenge, the PIN code and/or the foregoing password or possible other access conditions are accepted by the server.

The invention gives a new security aspect to authentication. The server is location sensitive. When access is granted with a password, it issues a password, preferably a one-time password (OTP) to the user. Access is granted only when the request is received at authorized locations and additionally if so desired during approved date/time periods. With this system, an IT department or service/content provider will be able to fine-tune access control to a new level. For example a user "A" can only request a OTP for an application "B" when being in an area "C" (e.g. a data center) at the date 20-25$^{th}$ December and time 9 am-6 pm. If the user tries to request an OTP after 6 pm or from a non-approved location, the OTP server can alert the admin to unusual usage patterns.

The invention will now be further described by means of some examples of preferred embodiments of the method of the invention by means of a signal diagram and a flow scheme. The invention is not to restrict the invention to the details of these examples, which are presented of illustrative purposes only.

DETAILED DESCRIPTION

Figure 1:
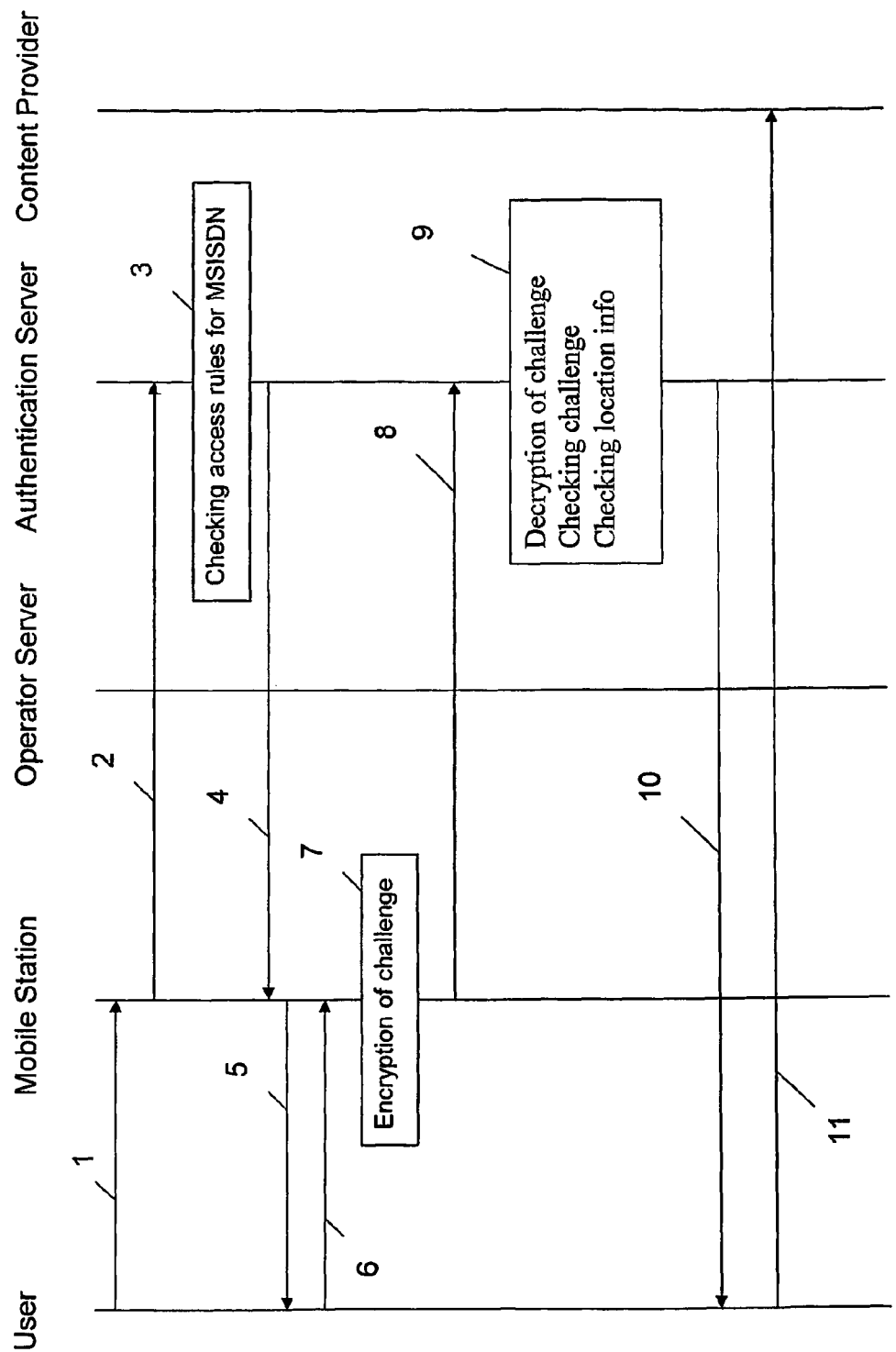
FIG. 1 is a signal diagram of an advantageous embodiment of the invention

FIG. 1 presents a signal diagram of an embodiment of the method of the invention. It is assumed that a content provider provides a service via e.g. internet and requires authentication of those users that wish to use the service.

The service can be used by users having a computer with access to internet or other network in which the content provider has the service. The service could also be used by a mobile station with access to internet or other network.

It is further assumed that a user, who has a mobile phone, now wish access the service. For this purpose, the user selects a service resulting to a notification to the mobile station (marked as signal 1 in figure). As a consequence of signal 1, a request for the service (which can contain a request for a password) is sent to an authentication server (via the operator server) from the mobile station of the user in signal 2.

From the message, the authentication server can see from which telephone number, i.e. MSISDN, the message was sent. The Mobile Station Integrated Service Digital Network Number, MSISDN, is the standard international telephone number used to identify a given subscriber. In step 3, the authentication server check which access rules apply for the subscriber in question based on the MSISDN. In addition for the location conditions (to be checked later), there might e.g. be time and special subscriber restriction for giving access to the requested service. In this example it is now assumed that the access conditions were fulfilled so far and in order to be sure that there really is the right person in the right place using the sending mobile station, the authentication server sends a challenge and a request for location information to the mobile station (via the operator server) in signal 4.

The challenge is a random number created by the authentication server using random number seed generating software to create a random or pseudo-random number. Most of the so-called random number generators on computers actually produce pseudo-random numbers. Pseudorandom numbers are numbers generated in a deterministic way, which only appear to be random. A random seed produced by the computer for the production of the random number. A good program produces a sequence that is sufficiently random for e.g. cryptographic operations. Seeding is a bootstrap operation. Once done, generating subsequent keys (numbers) will be more efficient.

Next, the mobile station requests a PIN code from the user in step 5. This is an optional step for further security in the method of the invention. In step 6, the user enters the PIN code to the mobile station. If the mobile station accepts the PIN code, the process continues by the mobile station encrypting the challenge with the user's private key in step 7.

The encrypted challenge and location information of the mobile station are sent to the authentication server (via the operator server, wherein conversion and such things might be carried out) in signal 8. In step 9, the authentication server decrypts the challenge with the user's public key and checks if the challenge corresponds to the one earlier sent by the authentication server to the mobile station. The authentication server also checks the location information. If both the challenge and the location information are accepted by the authentication server (the location has to fulfil access rule conditions), access is granted by e.g. giving a password for the requested service, which preferably is a one-time password, which is sent to the user (is sent to the mobile station and displayed on the screen) in step 10.

The user has now access to the requested service and can use the service, which is indicated by signal 11 in FIG. 1. Either the user uses the service directly with his mobile station (which has to have WAP (Wireless Application Protocol) or other interface to the network of the service provider (content provider) or then the user can use another computer connected to this network, e.g. internet.

Figure 2:
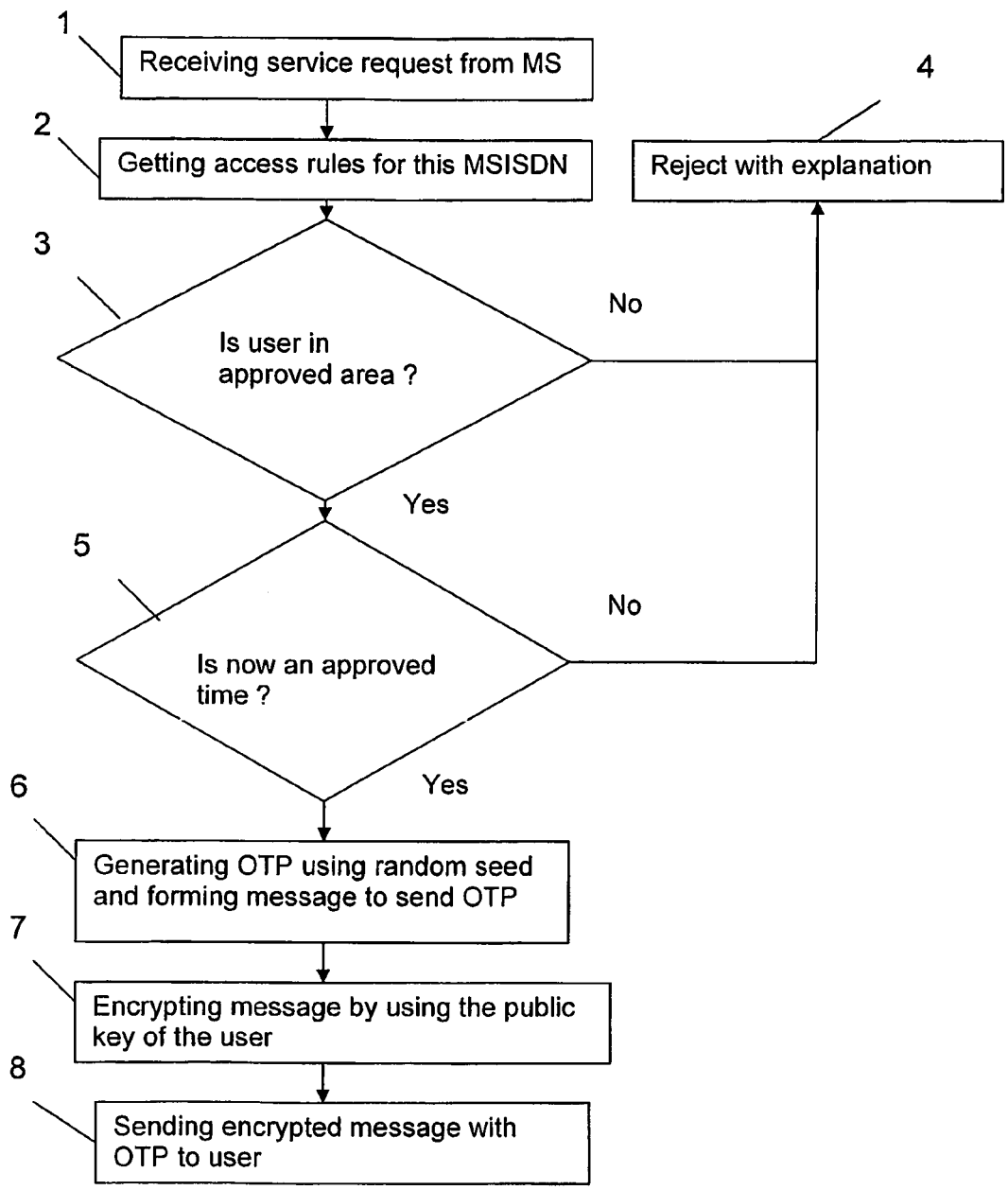
FIG. 2 is a flow scheme of an embodiment of the invention from the server's point of view

FIG. 2 is a flow scheme of another embodiment of the invention now presented from the server's point of view.

As in FIG. 1, it is assumed that a content provider provides a service via e.g. internet and requires authentication of those users that wish to use the service.

A user, who has a mobile phone, now wish to access the service and sends a service request (or password request) from his mobile station to the service. This request is received in step 1 of FIG. 2 by e.g. an authentication server (depending on how the authentication is arranged to be handled by the content provider) owned by the service or content provider.

From the message, the authentication server can see from which telephone number, i.e. MSISDN, the message was sent. In step 2 of FIG. 2, the authentication server checks which access rules apply for the subscriber in question based on the MSISDN. There might be e.g. location conditions for the access to the requested service, and therefore the authentication server checks in step 3 if the user is in an approved area to get access to the service. If this is not the case, a rejection message with explanation is sent to the mobile station in step 4. There might also be time restrictions for the access to the requested service and in step 5, the authentication server checks if this is an approved time to get access to the service. If this is not the case, a rejection message with informing the reason is sent to the mobile station marked with step 4 in FIG. 2.

If again the access conditions were fulfilled, the server grants access to the service. It might e.g. generate[s] a one-time password in step 6, e.g. by using the same random seed technique as mentioned before. A message for sending the One-Time-Password (OTP) to the user is e.g. formed by creating an OTP header showing the expiry date or expiry time for the OTP, and optionally the approved area for the MSISDN of the user. Finally, a checksum can be derived for the message content so that the authenticity of the content can be checked by the recipient (the mobile station), which checks if the checksum is valid when receiving the message. The message is then preferably concatenated and optionally encrypted in step 7 before sending.

If the message is to be encrypted an advantageous technique is to use an asymmetric encryption method by using the public key of the user for the encryption. Also some symmetric encryption method can be used.

The encrypted message, containing the OTP for the service, is then sent to the user in step 8. The message can then be decrypted by the mobile station of the user by the user's private key.

The above embodiments of the invention described by means of FIGS. 1 and 2 represent two typical examples of the implementation of the invention and one skilled in the art can easily see that many variations are possible within the scope of the claims, e.g. with respect to security level, using of time information, a challenge-response mechanism, the way of giving access to the service, e.g. by means of a one-time password or longer time password, using of PIN, using of encryption, selected encryption method, etc.

While the present invention has been described in accordance with preferred compositions and embodiments, it is to be understood that certain substitutions and alterations may be made thereto without departing from the spirit and scope of the following claims.

The invention claimed is:

1. A method for authentication in a telecommunication network comprising:
providing a mobile station having a telephone number associated therewith and an application installed therein and an authentication server giving access to services in the telecommunication network provided by a content provider, the mobile station obtaining location information of the mobile station by using the application, the application having information about which base station is serving the mobile station,
a user of the mobile station sending a request in a message from the mobile station,
the authentication server receiving the message and determining the telephone number of the mobile station and the location information based on the message,
the authentication server controlling time information and location information, the authentication server using the telephone number to determine whether the time information is an approved time and whether the location information is in an approved area to gain access to the services for the mobile station, and granting access to the user when the location information is within the approved area and the time information is an approved time so both the location and time information are accepted by the authentication server, the authentication server generating a one-time password (OTP) including a header showing the approved area and expiry time of the OTP and sending the OTP to the mobile station, and the mobile station receiving the one-time password (OTP) from the authentication server and using the one-time password (OTP) to gain access to the service provided by the content provider by sending an access signal to the content provider.

2. The method of claim 1 wherein the authentication server receives the location information from the mobile station.

3. The method of claim 2 wherein the mobile station sends the location information to the authentication server together with the request.

4. The method of claim 2 wherein the authentication server controls the location information by sending a request for location information to the mobile station and receiving the location information in a separate or later message.

5. The method of claim 2 wherein the mobile station monitors the location from which the request was sent by asking an application in the mobile station, which has information of a serving base station.

6. The method of claim 5 wherein the application is in a Subscriber Identification Module (SIM) of the mobile station.

7. The method of claim 2 wherein the mobile station receives the location information by means of a Global Positioning Service (GPS).

8. The method of claim 1 wherein the authentication server receives the location information from a network entity with information of a serving base station.

9. The method of claim 1 wherein the mobile station sends time information in messages of the mobile station to the authentication server in order to avoid multiplied use of a message to an authentication center.

10. The method of claim 1 wherein the authentication server sends a challenge to the mobile station as a reply to the request.

11. The method of claim 10 wherein the mobile station encrypts the challenge and sends the challenge back to the authentication server.

12. The method of claim 11 wherein the mobile station encrypts the challenge with a private key of the user of the mobile station.

13. The method of claim 12 wherein the authentication server decrypts the challenge with the public key of the user.

14. The method of claim 12 wherein the authentication server gives access to a service to the user when both the location information and a decrypted challenge are accepted by the server.

15. The method of claim 1 wherein the mobile station sends a PIN code to the authentication server.

16. The method of claim 1 wherein the mobile station sends a password to the authentication center.

17. The method of claim 2 wherein the location information, time information, a PIN code and/or a password is/are sent to an authentication center together with the password or request, with an encrypted challenge or in a separate message.

18. The method of claim 1 wherein the authentication server grants access to the user when both the location information and a decrypted challenge, a PIN code and/or a password are accepted by the server.

19. The method of claim 1 wherein the authentication server encrypts the OTP to be sent to the mobile station with a public key of the user.

* * * * *

UNITED STATES PATENT AND TRADEMARK OFFICE
CERTIFICATE OF CORRECTION

PATENT NO. : 8,423,768 B2  
APPLICATION NO. : 12/064256  
DATED : April 16, 2013  
INVENTOR(S) : Tea Vui Huang and Jari Nyholm Page 1 of 1

It is certified that error appears in the above-identified patent and that said Letters Patent is hereby corrected as shown below:

Title Page, item (73) Assignee should read as follows:

GIESECKE & DEVRIENT GMBH, Stockholm SE

Signed and Sealed this
Seventeenth Day of September, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,423,768 B2
APPLICATION NO. : 12/064256
DATED : April 16, 2013
INVENTOR(S) : Tea Vui Huang and Jari Nyholm Page 1 of 1

It is certified that error appears in the above-identified patent and that said Letters Patent is hereby corrected as shown below:

Title Page, item (73) Assignee should read as follows:

GIESECKE & DEVRIENT GMBH, Muenchen, Germany

This certificate supersedes the Certificate of Correction issued September 17, 2013.

Signed and Sealed this
Fifteenth Day of April, 2014

Michelle K. Lee
*Deputy Director of the United States Patent and Trademark Office*